United States Patent [19]

Sukegawa et al.

[11] Patent Number: 5,426,313
[45] Date of Patent: Jun. 20, 1995

[54] THIN FILM TRANSISTOR ARRAY HAVING OPTICAL SHIELD LAYER

[75] Inventors: Osamu Sukegawa; Hirofumi Ihara, both of Tokyo, Japan

[73] Assignee: NEC Corporation, Tokyo, Japan

[21] Appl. No.: 231,482

[22] Filed: Apr. 22, 1994

[30] Foreign Application Priority Data

Apr. 22, 1993 [JP] Japan .................. 5-119024

[51] Int. Cl.⁶ .............................................. G02F 1/133
[52] U.S. Cl. ....................................... 257/59; 257/72; 257/349; 359/59
[58] Field of Search ................ 359/54, 59, 62; 257/59, 257/72, 347, 349

[56] References Cited

U.S. PATENT DOCUMENTS

| 4,904,056 | 2/1990 | Castleberry | 359/54 |
| 5,237,436 | 8/1993 | Khan et al. | 359/59 |

FOREIGN PATENT DOCUMENTS

| 61-3118 | 1/1986 | Japan | 257/59 |
| 1-42635 | 2/1989 | Japan | 359/59 |
| 1-72121 | 3/1989 | Japan | 359/59 |
| 1-177020 | 7/1989 | Japan | 359/59 |
| 1-266513 | 10/1989 | Japan | 359/59 |
| 4-358127 | 12/1992 | Japan | 359/59 |
| 4-358129 | 12/1992 | Japan | 359/59 |

OTHER PUBLICATIONS

G. Kawachi et al., "A Novel Technology for a-Si TFT-LCDs with Buried ITO Electrode (BI) Structure", Japan Display, 1992, pp. 635–638.

*Primary Examiner*—Rolf Hille
*Assistant Examiner*—Minhloan Tran
*Attorney, Agent, or Firm*—Sughrue, Mion, Zinn, Macpeak & Seas

[57] ABSTRACT

In a thin film transistor formed by a gate electrode formed on a transparent insulating substrate, a semiconductor active layer opposing the gate electrode, a drain electrode, and a source electrode connected to a transparent pixel electrode, an optical shield layer is located so as to approximately surround the semiconductor active layer.

18 Claims, 7 Drawing Sheets

*Fig. 7A*
PRESENT INVENTION

THIN FILM TRANSISTOR ARRAY HAVING OPTICAL SHIELD LAYER

BACKGROUND OF THE INVENTION

1. Field of the Invention

The present invention relates to a thin film transistor (TFT) array used in an active matrix-type liquid crystal display (LCD) apparatus.

2. Description of the Related Art

An active matrix-type LCD apparatus is thin, so that it is often used in various display apparatuses. In this active matrix-type LCD apparatus, since individual pixel electrodes are independently driven, the contrast is not reduced based upon the reduction of a duty ratio, and also, the angle of visibility is not reduced, even when the capacity of display is increased to increase the number of lines.

In the active matrix-type LCD apparatus, one TFT is provided as a switching element for each pixel. A prior art TFT is constructed by a gate electrode formed on a transparent insulating substrate, a semiconductor active layer made of amorphous silicon opposing the gate electrode, a drain electrode and a source electrode connected to a transparent pixel electrode, which will be later explained in detail.

In the above-mentioned TFT used in an active matrix-type LCD apparatus, however, there is a large optical transmission area surrounding the semiconductor active layer. Therefore, light is incident from a backlight source through this optical transmission area to the semiconductor active layer. As a result, even when the TFT is in an OFF state, carriers are generated within the semiconductor active layer of the TFT to thereby increase an OFF current (leakage current) flowing therethrough. This may reduce the performance of the active matrix-type LCD apparatus.

SUMMARY OF THE INVENTION

It is an object of the present invention to reduce an OFF current (leakage current) flowing through a TFT.

Another object is to provide a high performance active matrix-type LCD apparatus.

According to the present invention, in a thin film transistor formed by a gate electrode formed on a transparent insulating substrate, a semiconductor active layer opposing the gate electrode, a drain electrode, and a source electrode connected to a transparent pixel electrode, an optical shield layer is located so as to approximately surround the semiconductor active layer.

BRIEF DESCRIPTION OF THE DRAWINGS

The present invention will be more clearly understood from the description as set forth below, with reference to the accompanying drawings, wherein.

DESCRIPTION OF THE PREFERRED EMBODIMENTS

Before the description of the preferred embodiments, a prior art TFT array will be explained with reference to FIGS. 1 through 4.

Figure 1:
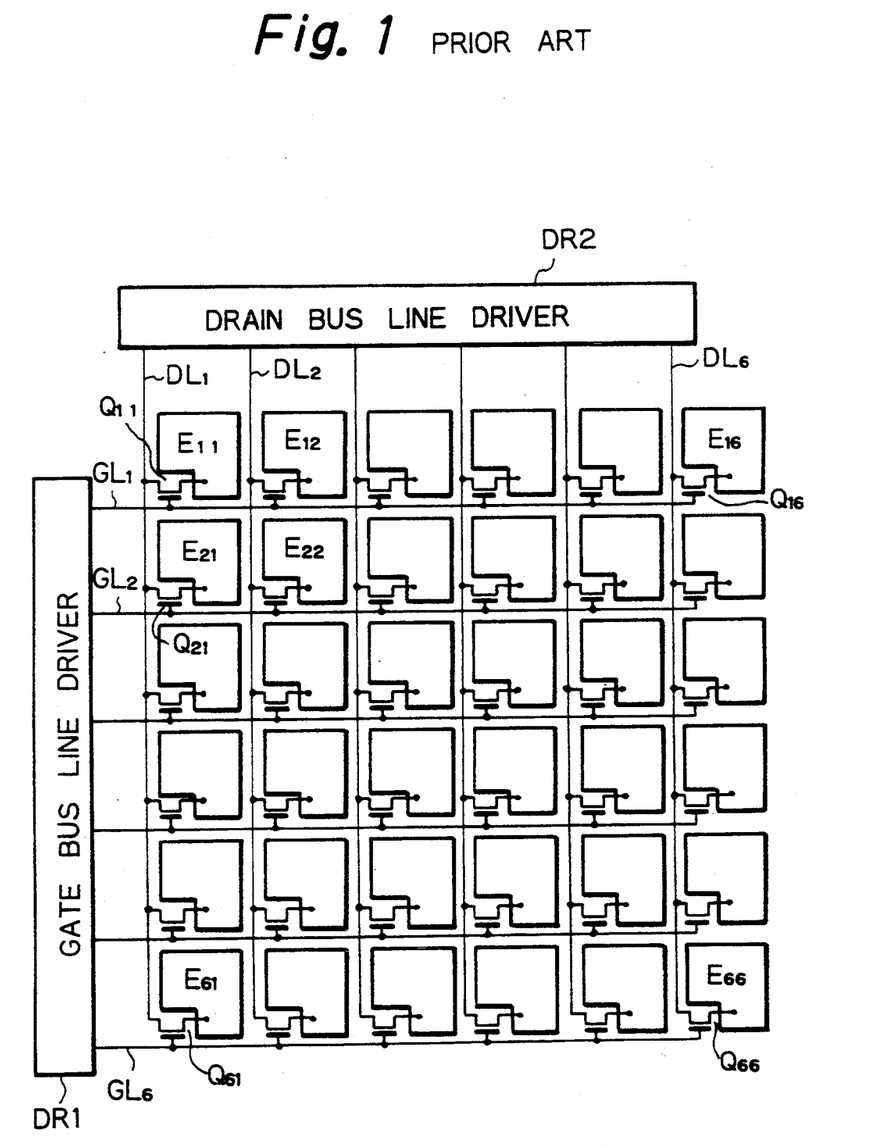
FIG. 1 is a circuit diagram illustrating a prior art active matrix-type LCD apparatus using a TFT array.

In FIG. 1, which illustrates a prior art active matrix-type LCD apparatus, references $GL_1$, $GL_2$, ..., $GL_6$ designate gate bus lines (or scan lines) driven by a gate bus line driver DR1, and $DL_1$, $DL_2$, ..., $DL_6$ designate drain bus lines (or signal lines) driven by a drain bus line driver DR2. A plurality of TFTs $Q_{11}$, $Q_{12}$, ..., $Q_{66}$ are provided at intersections of the gate bus lines $GL_1$, $GL_2$, ..., $GL_6$ and the drain bus lines $DL_1$, $DL_2$, ..., $DL_6$. That is, the TFT $Q_{ij}$ (i, j=1, 2, ..., 6) has a gate electrode connected to one of the gate bus lines $GL_1$, $GL_2$, ..., $GL_6$, a drain electrode connected to one of the drain bus lines $DL_1$, $DL_2$, ..., $DL_6$, and a source electrode connected to a transparent pixel electrode $E_{ij}$ (i, j=1, 2, ..., 6).

In FIG. 1, the gate bus lines $GL_1$, $GL_2$, ..., $GL_6$ are sequentially made high by the gate bus line driver DR1. For example, when the gate bus line $GL_1$ is made high, all of the TFTs $Q_{11}$, $Q_{12}$, ..., $Q_{16}$ connected to the gate bus line $GL_1$ are turned ON. Therefore, the pixel electrodes $E_{11}$, $E_{12}$, ..., $E_{16}$ are charged or discharged in accordance with the potentials at the data bus lines $DL_1$, $DL_2$, ..., $DL_6$. After the gate bus line $GL_1$ is made low, the potentials at the pixel electrodes $E_{11}$, $E_{12}$, ..., $E_{16}$ are maintained until the gate bus line $GL_1$ is again made high to thereby change them.

In order to enhance the display performance of the LCD apparatus of FIG. 1, the high potentials at the pixel electrodes have to be sufficiently high until they are changed. If some of the high potentials at the pixel electrodes are reduced, the display is not uniform so as to reduce the performance.

In order to maintain the high potentials at the pixel electrodes for a long time, the following conditions are required.

i) The area of each pixel electrode is as large as possible; and ii) The ratio of an ON current to an OFF current (leakage current) of each TFT is as large as possible. Particularly, it is essential to reduce the OFF current of each TFT.

Figure 2:
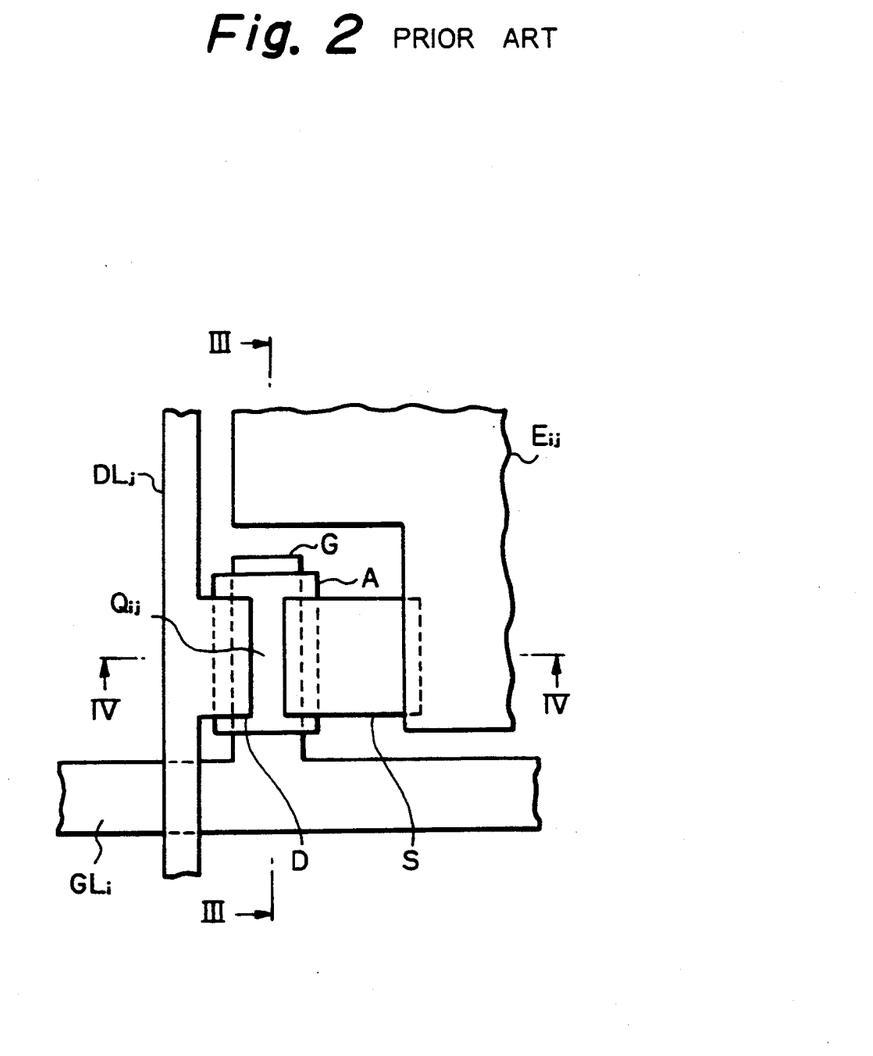
FIG. 2 is a partial plan view of the apparatus of FIG. 1.

In FIG. 2, which illustrates an enlargement of one pixel of FIG. 1, one TFT $Q_{ij}$ is constructed by a gate electrode G shunted from the gate bus line $GL_i$, a semiconductor active layer A made of amorphous silicon opposing the gate electrode G, a drain electrode D shunted from the drain bus line $DL_j$, and a source electrode S connected to the pixel electrode $E_{ij}$. One end of the semiconductor active layer A is connected to the drain electrode D, and the other end of the semiconductor active layer A is connected to the source electrode S.

Figure 3:
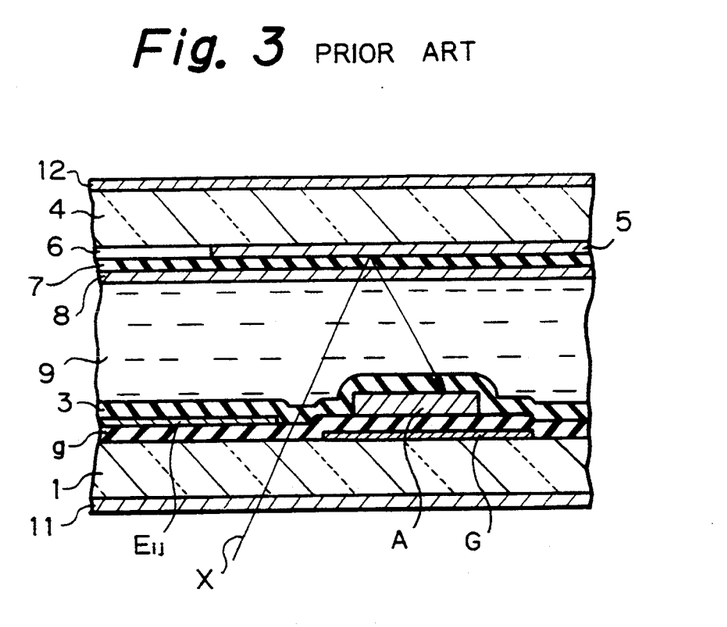
FIG. 3 is a cross-sectional view taken along the line III—III of FIG. 2.
Figure 4:
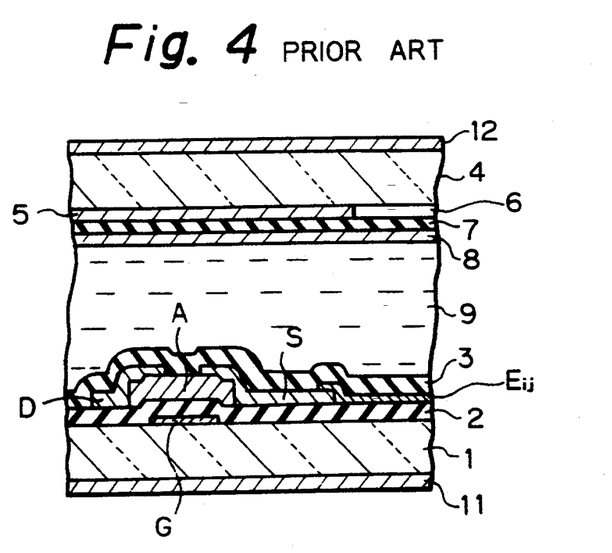
FIG. 4 is a cross-sectional view taken along the line IV—IV of FIG. 2.

In more detail, referring to FIGS. 3 and 4 which are cross-sectional views taken along the line III—III and the line IV—IV, respectively, of FIG. 2, the gate electrode G associated with the gate bus line $GL_i$ made of Cr is deposited and patterned on a glass substrate 1. Also, formed on the entire surface, a gate insulating layer 2 made of $SiN_x$ is deposited. Then, the semiconductor active layer A, the drain electrode D associated with the drain bus line $DL_j$, the source electrode S, and the pixel electrode $E_{ij}$ are formed. Further, a passivation layer 3 is formed on the entire surface.

On the other hand, formed on another glass substrate 4 are an optical shield layer (so-called black matrix) 5 and a color filter 6. Also, an insulating layer 7 made of $SiN_x$ and a transparent counter electrode 8 are formed.

The two above-mentioned glass substrates 1 and 4 are assembled with a space therebetween into which liquid crystal is filled, thus creating a liquid crystal layer 9. Also, two polarizer plates 11 and 12 are mounted outside of the glass substrates 1 and 4, respectively.

When no voltage is generated between the pixel electrode $E_{ij}$ and the counter electrode 8, light passes through both of the polarizer plates 11 and 12. On the contrary, when a voltage is generated between the pixel element $E_{ij}$ and the counter electrode 8, light does not pass through the polarizer plates 11 and 12.

In the TFT $Q_{ij}$ as illustrated in FIGS. 2, 3 and 4, however, there is a large optical transmission area surrounding the semiconductor active layer A. That is, as indicated by an arrow X in FIG. 3, backlight is reflected by the light shield layer 5 and is incident to the semiconductive active layer A, to thereby create carriers therein. Therefore, even if the TFT is in an OFF state, a leakage current is increased, to reduce the display performance.

Figure 5:
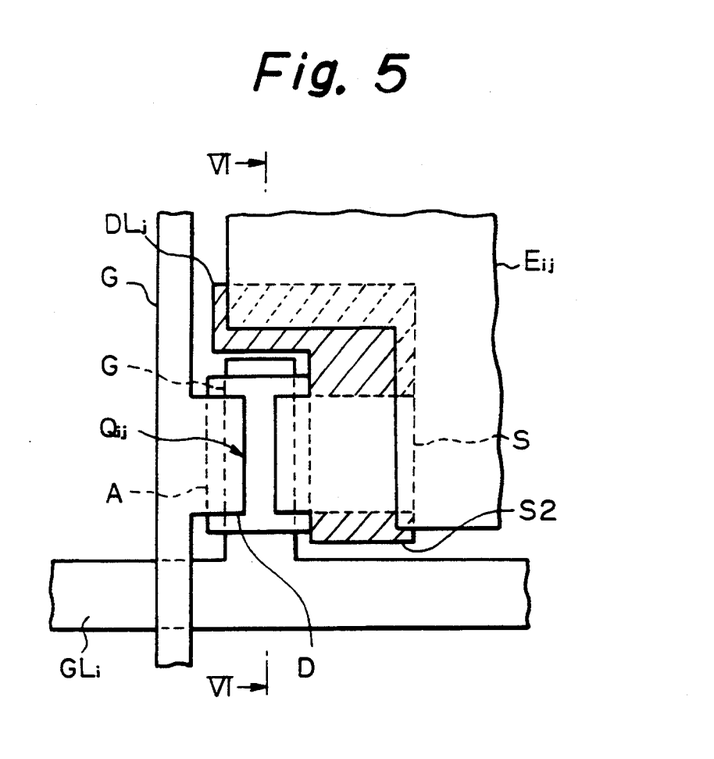
FIG. 5 is a partial plan view illustrating a first embodiment of the TFT array according to the present invention.
Figure 6:
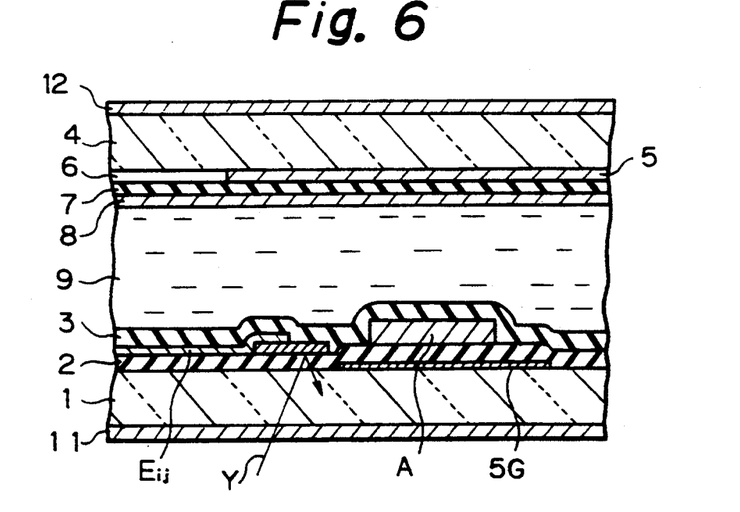
FIG. 6 is a cross-sectional view taken along the line VI—VI of FIG. 5.

In FIG. 5, which illustrates a first embodiment of the present invention, optical shield layers S1 and S2 made of Cr, for example, are added to the elements of FIG. 2. The optical layers S1 and S2 are located between the semiconductor active layer A and the pixel electrode $E_{ij}$. As illustrated in FIG. 6, which is a cross-sectional view taken along the line VI—VI of FIG. 5, backlight is reflected by an arrow Y and incident light to the semiconductor active layer A is reduced thereby. Therefore, when the TFT is in an OFF state, the leakage current is reduced, thus improving the display performance.

Note that the optical shield layers S1 and S2 can be formed independently of the source electrode S, but, as illustrated in FIGS. 5 and 6, the optical shield layers S1 and S2 are extensions of the source electrode S, thus reducing the manufacturing cost.

The manufacturing process of the TFT of FIGS. 5 and 6 is explained below.

First, a 0.2 μm thick Cr layer is deposited by sputtering on the glass substrate 1, and patterned by a photolithography process and a wet etching process to form the gate electrode G and the gate bus line $GL_i$.

Next, a 0.3 μm thick silicon nitride layer is deposited in a plasma chemical vapor deposition (CVD) chamber using a gas of $SiH_4$, $NH_3$ and $N_2$, to form the gate insulating layer 2. Subsequently, a gas of $SiH_4$ and $H_2$ is introduced into the plasma CVD chamber to grow amorphous silicon having a thickness of 0.2 μm. Further, a gas of $PH_3$ is introduced into the plasma CVD chamber to grow a 150 nm thick $N^+$-type amorphous silicon (not shown). Then, the phosphous silicon including $N^+$-type phosphous silicon is patterned by a photolithography process and a reactive ion etching (RIE) process to form the semiconductive active layer A.

Next, a 0.5 μm thick Cr layer is deposited by sputtering, and is patterned by a photolithography process and a wet etching process to form the drain electrode D associated with the drain bus line $DL_j$, the source electrode S, and the optical shield plates S1 and S2. Then, the $N^+$-type amorphorous silicon on the amorphous silicon is etched by an RIE process to separate the drain electrode D from the source electrode S.

Next, a 0.2 μm thick Indium Tin Oxide (ITO) layer is formed by sputtering and is patterned by a photolithography process and a wet etching process, to form the transparent pixel electrode $E_{ij}$.

Next, a 0.5 μm thick silicon nitride layer is formed by plasma CVD using a gas of $SiH_4$, $NH_3$ and $N_2$, to form the passivation layer 3. Thus, the TFT is completed.

Figure 7A:
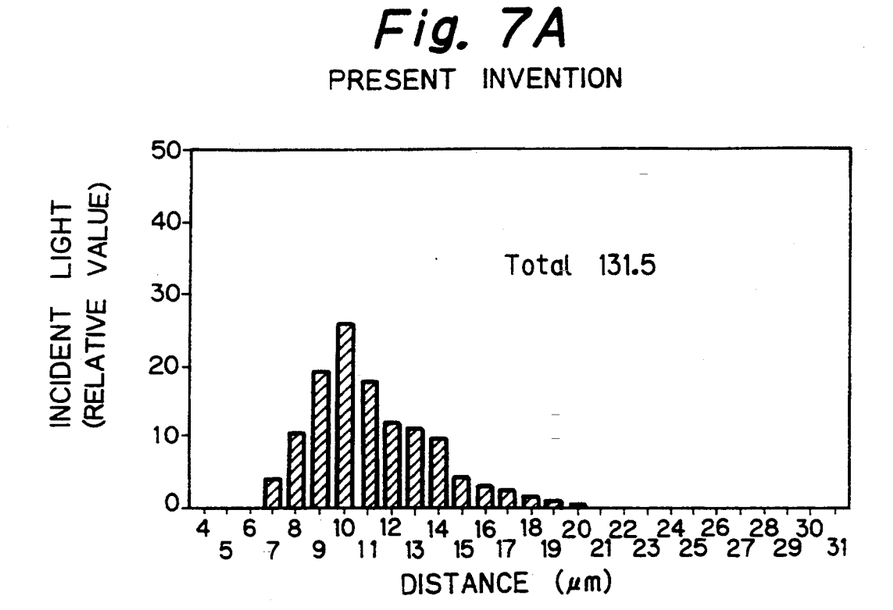
FIGS. 7A and 7B are graphs showing the amount of light incident to the amorphous silicon layer.
Figure 7B:
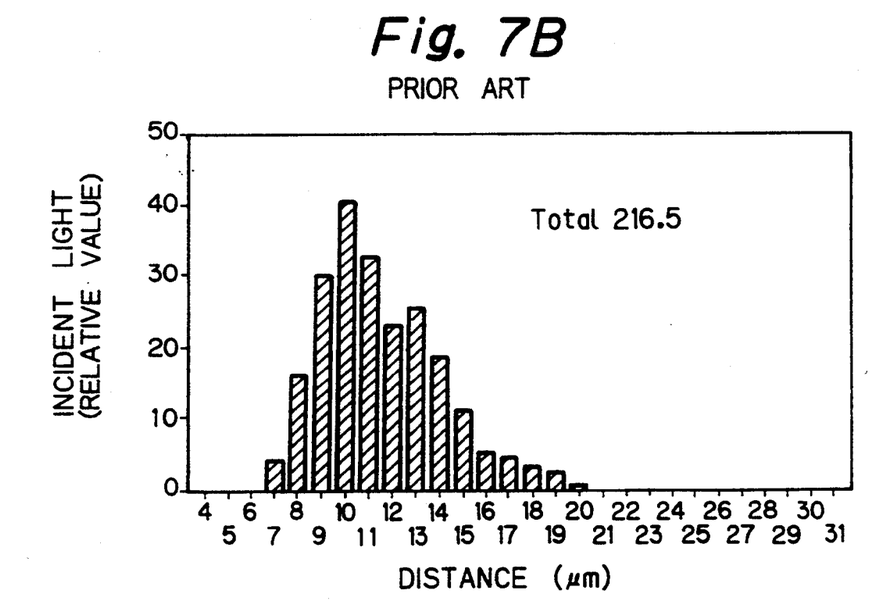

In FIGS. 7A and 7B, which show the amount of light incident to the semiconductor active layer A, the abscissa indicates a distance between the gate electrode G and a backlight source (not shown). In the present invention where the gap between the optical shield layer S1 and the gate G is 3 μm, as shown in FIG. 7A, the total incident light amount is 131.5. Conversely, in the prior art, as shown in FIG. 7B, the total incident light amount is 216.5. Thus, the amount of light incident to the semiconductor active layer A can be reduced by 40% as compared with the prior art.

Figure 8:
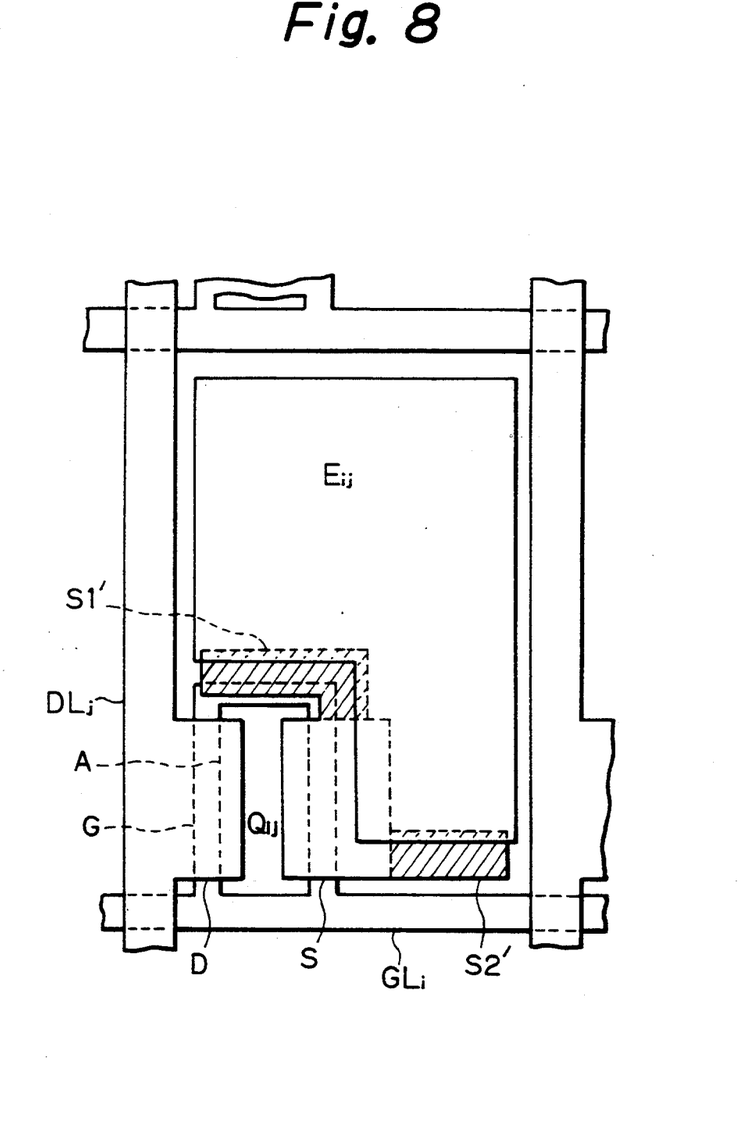
FIGS. 8 and 9 are partial plan views illustrating second and third embodiments of the TFT array according to the present invention.

In FIG. 8, which illustrates a second embodiment of the present invention, the gate electrode G completely covers the semiconductor active layer A from the bottom. In this second embodiment, an optical shield layer S1' is smaller than the optical shield layer S1 of FIG. 5. Also, an optical shield layer S2' is located between the pixel electrode $E_{ij}$ and the gate bus line $GL_i$.

Figure 9:
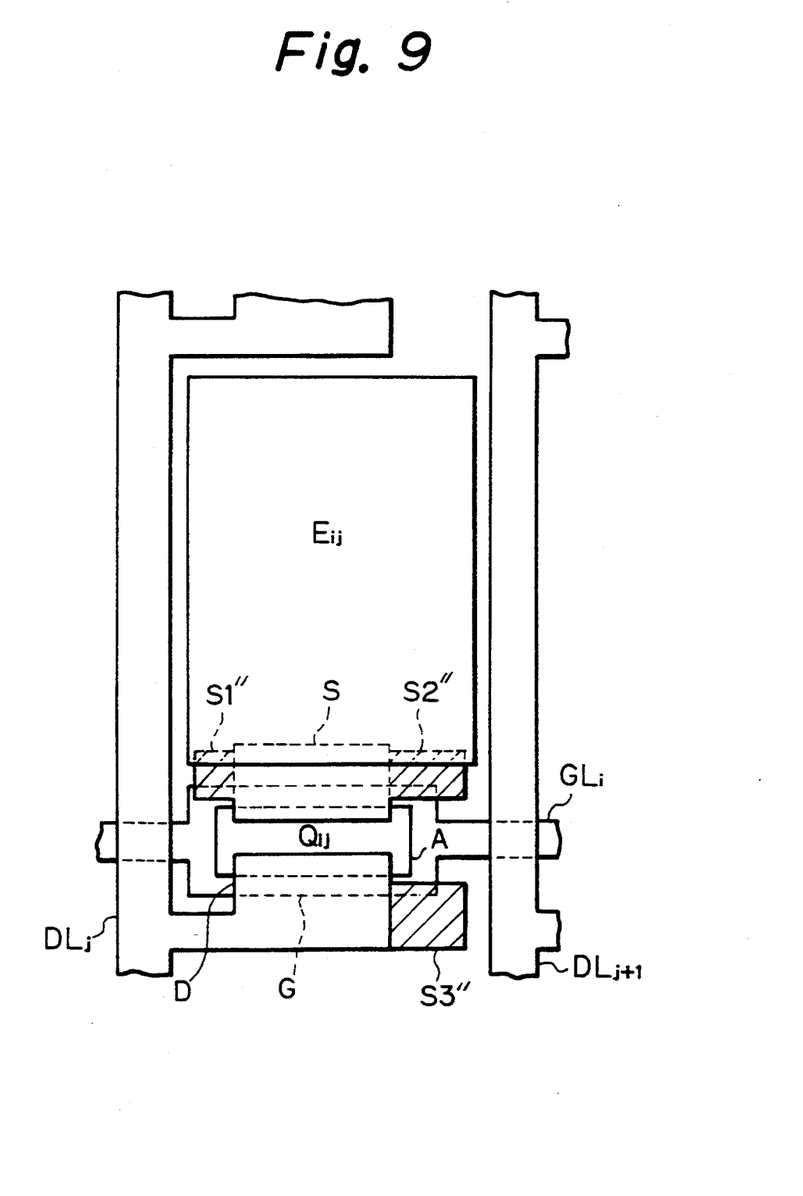

In FIG. 9, which illustrates a third embodiment of the present invention, the gate electrode G is not shunted from the gate bus line $GL_i$, but is a part of a wider portion of the gate bus line $GL_i$. In this third embodiment, optical shield layers S1" and S2" are located between the semiconductor active layer A and the pixel electrode $E_{ij}$, Contrary to this, an optical shield layer S3" is located on the side of the drain electrode D, i.e., between the drain electrode D and the drain bus line $DL_{j+1}$.

In the above-described embodiments, although the pixel electrode $E_{ij}$ is located over the source electrode S, the pixel electrode $E_{ij}$ can be located beneath the source electrode S.

As explained hereinbefore, according to the present invention, since the optical shield layers reduce the amount of light incident to the semiconductor active layer of the TFT, the OFF current of the TFT can be reduced. Therefore, the display performance of an active matrix-type LCD apparatus using this type of TFT can be improved.

We claim:

1. A thin film transistor array comprising:
   a transparent insulating substrate;
   a plurality of gate bus lines formed on said transparent insulating layer;
   a plurality of drain bus lines formed on said transparent insulating layer;
   a plurality of transparent pixel electrodes formed on said transparent insulating layer;
   a plurality of thin film transistors each having a gate electrode connected to one of said gate bus lines, a semiconductor active layer formed on said gate electrode via an insulating layer, a drain electrode connected between said semiconductor active layer and one of said drain bus lines, and a source electrode connected between said semiconductor active layer and one of said transparent pixel electrodes; and a plurality of optical shield means associated with said thin film transistors, each of said plurality of optical shield means approximately surrounding said semiconductor active layer of a thin film transistor, wherein each of said optical shield means comprises an extension of said source electrode of the associated thin film transistor.

2. An array as set forth in claim 4, wherein each of said optical shield means is located between said semiconductor active layer and one of said transparent pixel electrodes.

3. An array as set forth in claim 4, wherein each of said optical shield means is located between one of said drain electrodes and one of said drain bus lines.

4. An array as set forth in claim 1, wherein said semiconductor active layer is made of amorphous silicon.

5. An apparatus as set forth in claim 1, wherein each of said plurality of optical shield means further comprises an extension of the drain electrode of its associated thin film transistor.

6. A thin film transistor array comprising:
a transparent insulating substrate;
a plurality of gate bus lines formed on said transparent insulating layer;
a plurality of drain bus lines formed on said transparent insulating layer;
a plurality of transparent pixel electrodes formed on said transparent insulating layer;
a plurality of thin film transistors each having a gate electrode connected to one of said gate bus lines, a semiconductor active layer formed on said gate electrode via an insulating layer, a drain electrode connected between said semiconductor active layer and one of said drain bus lines, and a source electrode connected between said semiconductor active layer and one of said transparent pixel electrodes; and
a plurality of optical shield means associated with said thin film transistors, each of said plurality of optical shield means approximately surrounding said semiconductor active layer of a thin film transistor, wherein each of said optical shield means comprises an extension of said drain electrode of the associated thin film transistor.

7. An array as set forth in claim 6, wherein each of said optical shield means is located between said semiconductor active layer and one of said transparent pixel electrodes.

8. An array as set forth in claim 6, wherein each of said optical shield means is located between one of said drain electrodes and one of said drain bus lines.

9. An array as set forth in claim 6, wherein said semiconductor active layer is made of amorphous silicon.

10. An active Matrix-type display apparatus comprising:
first and second transparent insulating substrates, arranged in parallel to each other and having electro-optic material therebetween;
a plurality of gate bus lines in parallel to each other formed on said first transparent insulating substrate;
a plurality of drain bus lines in parallel to each other formed on said first transparent insulating substrate, said drain bus lines being perpendicular to said gate bus lines;
a plurality of gate electrodes formed on said first transparent insulating layer, each of said gate electrodes being connected to one of said gate bus lines;
an insulating layer formed on said gate electrodes;
a plurality of transparent pixel electrodes formed on said insulating layer;
a plurality of semiconductor active layers formed on said insulating layer, each of said semiconductor active layers opposing one of said gate electrodes;
a plurality of drain electrodes formed on said insulating layer, each of said drain electrodes being connected between one of said semiconductor active layers and one of said drain bus lines;
a plurality of source electrodes formed on said insulating layer, each of said drain electrodes being connected between one of said semiconductor active layers and one of said transparent pixel electrodes;
a counter electrode formed beneath said second transparent insulating substrate; and
a plurality of optical shield means associated with said thin film transistors, each of said plurality of optical shield means approximately surrounding said semiconductor active layer of a thin film transistor, wherein each of said optical shield means comprises an extension of said source electrode of the associated thin film transistor.

11. An apparatus as set forth in claim 10, wherein each of said optical shield means is located between one of said semiconductor active layers and one of said transparent pixel electrodes.

12. An apparatus as set forth in claim 10, wherein each of said optical shield means is located between one of said drain electrodes and one of said drain bus lines.

13. An apparatus as set forth in claim 10, wherein said semiconductor active layers are made of amorphous silicon.

14. An apparatus as set forth in claim 10, wherein each of said plurality of optical shield means further comprises an extension of the drain electrode of its associated thin film transistor.

15. An active matrix-type display apparatus comprising:
first and second transparent insulating substrates, arranged in parallel to each other and having electro-optic material therebetween;
a plurality of gate bus lines in parallel to each other formed on said first transparent insulating substrate;
a plurality of drain bus lines in parallel to each other formed on said first transparent insulating substrate, said drain bus lines being perpendicular to said gate bus lines;
a plurality of gate electrodes formed on said first transparent insulating layer, each of said gate electrodes being connected to one of said gate bus lines;
an insulating layer formed on said gate electrodes;
a plurality of transparent pixel electrodes formed on said insulating layer;
a plurality of semiconductor active layers formed on said insulating layer, each of said semiconductor active layers opposing one of said gate electrodes;
a plurality of drain electrodes formed on said insulating layer, each of said drain electrodes being connected between one of said semiconductor active layers and one of said drain bus lines;
a plurality of source electrodes formed on said insulating layer, each of said drain electrodes being connected between one of said semiconductor active layers and one of said transparent pixel electrodes;

a counter electrode formed beneath said second transparent insulating substrate; and a plurality of optical shield means associated with said thin film transistors, each of said plurality of optical shield means approximately surrounding said semiconductor active layer of a thin film transistor, wherein each of said optical shield means comprises an extension of said drain electrode of the associated thin film transistor.

16. An apparatus as set forth in claim 15, wherein each of said optical shield means is located between one of said semiconductor active layers and one of said transparent pixel electrodes.

17. An apparatus as set forth in claim 15, wherein each of said optical shield means is located between one of said drain electrodes and one of said drain bus lines.

18. An apparatus as set forth in claim 15, wherein said semiconductor active layers are made of amorphous silicon.

* * * * *